Aug. 31, 1926.                                                          1,597,933
O. SPENKER
FUEL LEVEL WARNING DEVICE FOR MOTOR VEHICLES
Filed March 18, 1925
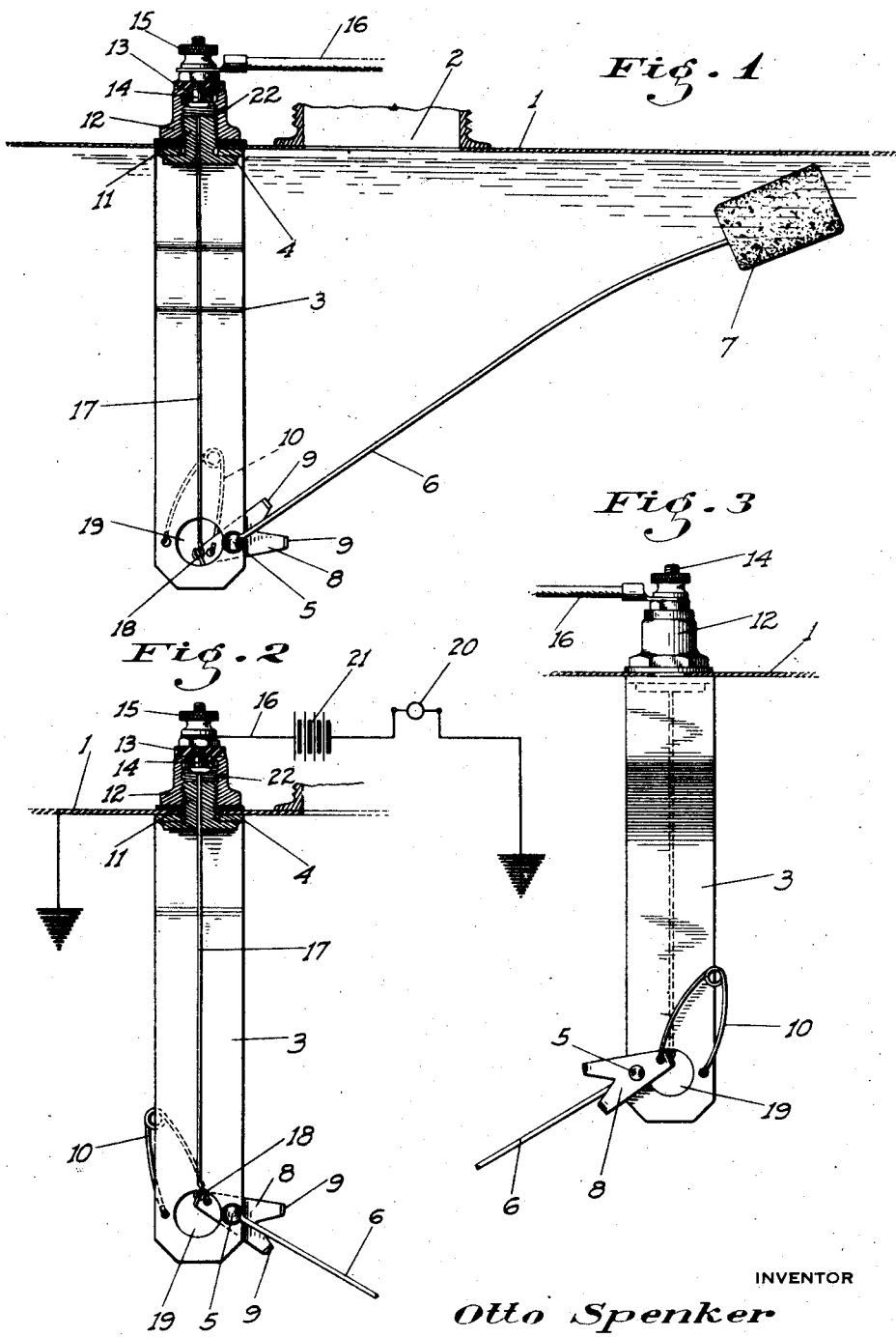
INVENTOR
*Otto Spenker*
BY *Perry J. Webster*
ATTORNEY Patented Aug. 31, 1926.

1,597,933

UNITED STATES PATENT OFFICE.

OTTO SPENKER, OF LODI, CALIFORNIA.

FUEL-LEVEL WARNING DEVICE FOR MOTOR VEHICLES.

Application filed March 18, 1925. Serial No. 16,338.

This invention relates to improvements in accessories for motor vehicles and particularly to devices for warning the drivers of such vehicles when the fuel in the main tank is about exhausted.

The principal object of my invention is to provide a device for the purpose by means of which, when the fuel is at a predetermined low level, a signal of suitable character will be given the driver so that he will know that he must shortly replenish his supply.

Another object is to provide a device for the purpose so constructed that with the lowering of the fuel level to a predetermined point an electric circuit is closed to operate a signal, the current for the circuit being obtained from the usual battery of the car. At the same time the contact or circuit closing mechanism is so arranged that there is practically no danger of any spark formed on making the contact igniting the fuel.

A further object is to provide a device in the form of an attachment which may be readily applied to any tank by merely drilling a single hole in the top thereof.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Fig. 1 is a side view of one side of my device partly in section, as installed in a tank showing the position of the parts when the tank is full.

Fig. 2 is a similar view with the parts in their position when the tank is empty.

Fig. 3 is a side view of the opposite side of the device with the parts in the same position as in Fig. 2.

Referring now more particularly to the characters of reference on the drawings, the numeral 1 denotes a fuel tank having the ordinary filler opening 2.

My device comprises a vertical hanger 3 adapted to fit through the opening 2 and having a horizontal flange 4 at its upper end adapted to abut against the upper surface of the tank.

Pivoted onto the hanger at the lower end thereof by a pin 5 is a float rod 6 having a float 7 of suitable nature on its outer end.

Likewise pivoted on the pin 5 but movable independently of the rod 6 is a plate 8 extending longitudinally of the rod 6. The outer end of the plate has vertically spaced stop lugs 9 between which the rod 6 is freely movable. The opposite end of the plate is connected to one end of a double acting spring 10, the other end of which is connected to the hanger 3, said latter connection being in horizontal alinement with the pin 5.

By means of this construction the rod 6 can move one way or the other between the stops 9 without moving the plate 8, which is held either above or below a horizontal position by the spring 10. When the rod abuts against one of the stops 9 it will turn the plate about the pin until the connection of the spring with the plate has passed the horizontal line of the pin 5 and the hanger connection of said spring. The latter then acts to suddenly and quickly move the plate a further amount in the same direction regardless of the further movement of the rod 6. This form of snap action spring structure, which can be arranged in different ways, is commonly employed in various arts, and of itself forms no part of my invention.

Fixed onto the flange 4 and projecting thereabove is a tubular stud 11 on to which a nut 12 is removably screwed. The top of the nut is covered by an insulating pad 13 in which is mounted a contact pin 14. The pin projects through the pad both ways, its lower end terminating above the stud in spaced relation thereto. The upper end of the pin is threaded to receive a binding post nut 15 to which a wire 16 may be connected.

Attached to the inner end of the plate 8 is a wire 17 or the like which slides with a neat running fit through the stud 13. The length of this wire is such that when the plate 8 is in its uppermost position the upper end of the wire will firmly abut against the pin 14.

The plate is limited in its movement both ways by means of a stop lug 18 formed at the inner end thereof which projects through an orifice 19 formed in the hanger 3.

In installing the device a hole for the stud 11 is drilled in the top of the tank close to the opening 2. The nut 12 is removed from the stud and the hanger, with the other parts attached thereto, is lowered into the opening 2. The hanger is then moved to one side of said opening so that the stud may be projected through the hole in the tank provided therefor. This hole is located so that a hold on the hanger may be maintained from outside the opening 2 until the nut 12 is screwed onto the stud and tightened down so that the flange 4 is firmly impinged against the tank. The hanger 3 is therefore held in an immovable and rigid manner.

The wire 16 is then connected to a signal device. The latter may be the horn of the car or other audible signal, or it may be a light 20 interposed in the leads 16 in connection with a source of current, such as a battery 21. As is customary, in automobile practice, one lead from the light or battery is grounded on the car while the tank 1, being of metal, may also be considered as grounded. The hanger 3 and parts attached thereto, being likewise metal and having metallic contact with the tank, a circuit is closed from ground through light 20, battery 21, lead 16 to the pin 14; and through wire 17, hanger 3, and tank 1 back to ground when said wire 17 is in contact with the pin 14.

The float is preferably so arranged that when the wire 17 is tripped by the downward movement of the float rod and the signal actuated a sufficient quantity of fuel will still remain in the tank to allow the car to be driven to a filling station.

Though there is very little chance of any gas accumulating in the small chamber formed between the stud 11 and nut 12, the latter may have a lateral bleed hole 22 therethrough above the stud to allow of the escape of any gas as may be in said chamber.

By reason of the snap action spring structure the contact or breaking of the wire with the pin is had instantly and without any slow drag such as would tend to cause the formation of sparks.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A switch mechanism comprising a hanger adapted to depend into a fuel tank, a contact pin insulated from the tank and hanger, a stem to make and break contact with the pin mounted in connection with the hanger on one side thereof for vertical movement relative thereto, a plate pivoted on the hanger on the opposite side thereof from the said stem, a lug on the plate projecting through an orifice provided in the hanger, the stem being attached to the lug, said orifice being of greater height than the lug whereby to limit the vertical movement of the lug, plate and stem, and a float structure operatively connected to the plate to control the vertical movement of the same.

In testimony whereof I affix my signature.

OTTO SPENKER.